United States Patent Office 2,914,536
Patented Nov. 24, 1959

2,914,536
NOVEL 3-ACYLAMINO TRIAZOLES

William B. Hardy and John F. Hosler, Bound Brook, N.J., assignors to American Cyanamid Company, New York, N.Y., a corporation of Maine No Drawing. Application November 21, 1957
Serial No. 697,769
4 Claims. (Cl. 260—308)

The present invention relates to new and novel 3-acylamino triazoles, and to biocidal compositions prepared therefrom. More particularly, it relates to compounds which may be characterized by the formula:

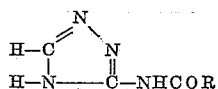

wherein R stands for a substituted alkyl radical of from 1 to 4 carbon atoms such as trichloro alkyl and lower alkoxy alkyl. Illustrative of the alkyl radical is methyl, ethyl, propyl, n-butyl, isobutyl, sec-butyl, and alkoxy includes methoxy, ethoxy, n-butoxy, n-propoxy, and isomers thereof.

The compounds of the present invention have been found to be effective agricultural biocides particularly possessing good herbicidal and fungicidal activity. Although 3-amino-1,2,4-triazole is a known herbicide, the compounds of the present invention are unexpectedly superior in that they may be used at lower concentrations and with attendant higher percentages of activity. Moreover, they are particularly effective in preventing and retarding fungus growth on seeds, soils, plants, fruits, fur, cotton and other organic materials.

The 3-acylamino triazoles of the present invention can be synthesized, as for example by reacting 3-amino-1,2,4-triazole with an appropriate substituted acyl halide to form the corresponding 3-substituted amido triazole. Illustrative acyl halide reactants are: trichloroacetyl chloride, β-trichloropropionyl chloride, methoxyacetyl chloride, ethoxyacetyl chloride, methoxypropionyl chloride, α,α-dichloro-β-monochloropropionyl chloride and the like. In general, the acyl reactant contains of from 2 to 4 carbon atoms.

The compounds of the present invention are advantageously prepared by the acylation of amino triazole under ordinary conditions of temperature and pressure. For example, the acylation is conducted at ambient temperatures and atmospheric pressures. Resultant products are characterized as being substantially insoluble in water but soluble in a variety of organic solvents. Accordingly, the compounds may be incorporated in any of a wide variety of suitable carriers of diluents to prepare agriculturally suitable biocidal compositions.

Such compositions may be formulated either as a suspension in a suitable non-solvent or as a dust. A suspension of the substituted triazoles in a non-solvent therefor, such as water, is advantageously used in the treatment of plant foliage. Additionally, the compounds of the present invention may be applied to plant foliage by the aerosol method. Solutions for the aerosol treatment may be prepared either by dissolving the appropriate substituted triazole directly in a high volatile liquid, as for instance trichloro methane, or by dissolving the substituted triazole in a lesser volatile solvent as benzene, and thereafter mixing resultant solution with a highly volatile liquid aerosol carrier.

It is a further advantage of the present invention that the triazole compounds may be employed to protect fruits, seeds, plants and the like during storage by preparing an aqueous emulsion formed by dissolving the biocide in an oil and then emulsifying the latter with water. The oil that may be employed is a hydrocarbon, as for instance benzene or toluene or a hydrogenated hydrocarbon such as chlorobenzene, fluorotrichloro methane or dichlorodifluoro methane and equivalents thereof.

The compounds of the present invention may further be prepared as a dust by admixing substituted triazole with materials as for instance clay, bentonite, pumice, charcoal and fuller's earth. Accordingly, seeds can be protected from soil organisms by incorporating the compounds of the present invention with a solid carrier and admixing the composition with the seed, such as by tumbling for purposes of coating the seed.

Advantageously, large excesses of inert carrier or diluent with respect to the biocidal compounds of the present invention may be used. The weight-wise range of inert carrier to active compound is broad and is not considered critical. For instance, it has been found that up to about 10% by weight of the compound based on the weight of the inert carrier is generally more than adequate. In most cases, not more than about 5% of active ingredient, and preferably from about 0.1% to 0.5% is satisfactory for most applications.

When the biocidal compounds are used as an aqueous suspension, that composition can advantageously contain a dispersing agent for the compound. Illustrative of such agents are the sodium salt of a polymerized propyl naphthalene sulfonic acid formed by condensing formaldehyde with propyl naphthalene sodium sulfonate, the alkyl polyethylene alcohols such as Triton X-100, the fatty acid esters of polyhydric alcohols, as for example "Span." A good practice in employing any commerically available dispersing agent is to add from about 1 to about 5 parts of agent per 100 parts of biocidal compound.

Although the biocidal compounds of the present invention can be employed either in a powder or in other inert carriers, a multi-purpose composition may be formulated by adding additional active ingredients thereto. Contemplated adjuvants which may be used are "Malathion," "Parathion," DDT suspended in water, and the like.

To facilitate a complete understanding of the invention and, particularly, how the active biocidal compositions are prepared, the following examples are given for purposes of illustrating specific details. It is understood that the following examples are merely illustrative and are not presented by way of limitation. Unless otherwise noted, all parts are by weight.

EXAMPLE 1

Preparation of 3-trichloroacetamido-4H-1,2,4-triazole

To a mixture containing 8.4 parts of 3-amino-4H-1,2,4-triazole in 100 parts by volume of pyridine is added, while cooling, 18.2 parts of trichloroacetyl chloride. An exothermic reaction develops and when it subsides the reaction has gone to completion. After two hours, the product is recovered by drowning the reaction mixture in water, filtering, and then drying recovered solid. The latter is slurried in hot alcohol, then filtered again and reslurried in hot carbon tetrachloride and dried. The melting point of the trichloroacetamido triazole is 293° C.–294° C. with decomposition. A good yield of product is obtained. The product analyzes as follows:

Calculated for $C_4H_3Cl_3N_4O$: C, 20.95; H, 1.31; N, 24.4; Cl, 46.5. Found: C, 21.8; H, 1.34; N, 24.5; Cl, 44.4.

EXAMPLE 2

*Preparation of 3-methoxyacetamido-4H-1,2,4-triazole*

To 50 parts of pyridine by volume is added 8.4 parts of 3-amino-4H-1,2,4-triazole. The latter solution is next cooled to about 5° C. and 11 parts of methoxyacetyl chloride are added thereto while cooling the reaction mixture. After standing for about thirty minutes, the product is recovered by filtration and dried. Its melting point is 213° C.–218° C. After recrystallization from ethyl alcohol a white powder is obtained, melting sharply at 234° C.–235° C., analyzing as follows:

Calculated for $C_5H_8N_4O_2$: C, 38.4; H, 5.1; N, 35.9. Found: C, 38.8; H, 5.02; N, 35.9.

EXAMPLE 3

*Preparation of N-1,2,4-triazole-3-yl-α,α,β-trichloropropionamide*

8.5 parts of trichloropropionyl chloride are added to 3.62 parts of 3-amino-1,2,4-triazole in 75 parts by volume of pyridine while cooling the reaction mixture. The latter is allowed to stand until the reaction is complete. At the end of five hours, it is then slowly poured into 600 parts of water. The product precipitating is recovered by filtration, then washed with water and dried. The product is characterized by a melting point of 220° C.–226° C. with decomposition. Upon analysis, the following is observed:

Calculated for $C_5H_5ON_4Cl_3$: C, 24.8; H, 2.65; N, 23.13; Cl, 43.40. Found: C, 25.0; H, 2.30; N, 23.0; Cl, 43.5.

To demonstrate the biocidal activity of the compounds of the present invention, the following examples are presented.

EXAMPLE 4

This example illustrates the fungicidal activity of the compounds of the present invention.

To an aqueous suspension of 50,000 spores of specified fungi species (defined more particularly in the following table) per cc. water is added a triazole compound as prepared in Examples 1 and 3, respectively. In a dilution of less than 0.001%, resultant suspension is rotated for twenty hours. The percent kill of the fungi spores is also indicated as tabularized below:

TABLE I

| Compound | Conc. of Compound (Percent) | Percent Kill of Sclerotinia fructigena | Conc. of Compound (Percent) | Percent Kill of Stemphylium sarcinaeforme |
|---|---|---|---|---|
| 3-Trichloroacetamido-4H-1,2,4-Triazole. | 0.01 | 100 | 0.001 | 95 |
|  | 0.001 | 25 |  |  |
| N-1,2,4-Triazole-3-yl-α,α,β-Trichloropropionamide. | 0.01 | 100 | 0.01 | 100 |
|  | 0.001 | 25 | 0.001 | 50 |
| 3-Amino-1,2,4-Triazole | 0.10 | 0 | 0.10 | 50 |
|  |  |  | 0.01 | 0 |

EXAMPLE 5

This example illustrates the herbicidal activity of the compounds of the invention. The compound as prepared in Example 2 is illustrated.

Radish seeds which represent dicotyledenous plants are treated with a 0.1% aqueous solution containing 3-methoxyacetamido-4H-1,2,4-triazole by introducing about 50 radish seeds to an aqueous medium containing the biocidal compound. Resultant mixture is then intimately admixed as by tumbling for twenty hours. The seed mortality is determined by standard germination tests after the treatment. The data is compared with similarly treated seeds, except that 3-amino-1,2,4-triazole is substituted for the methoxyacetamido triazole of the example and the results are recorded in the table below.

TABLE II

| Compound | Conc. of Compound (Percent) | Percent Kill |
|---|---|---|
| 3-Methoxyacetamido-4H-1,2,4-Triazole | 0.1 | 100 |
| 3-Amino-1,2,4-Triazole | 0.1 | 26 |

From the above data, it is readily seen that the compound of the present invention is approximately four times as effective as is the related control herbicidal compound.

We claim:

1. A compound of the formula:

$$\begin{array}{c} \phantom{H-C}N \\ \phantom{H-C}\diagup\phantom{xx}\diagdown \\ H-C\phantom{xxxx}N \\ |\phantom{xxxxxx}\| \\ H-N-\!\!-\!\!-\!\!-C-NHCOR \end{array}$$

where R is a substituted alkyl radical of not more than 4 carbon atoms selected from the group consisting of trichloroalkyl and methoxyalkyl.

2. 3-trichloroacetamido-4H-1,2,4-triazole.
3. 3-methoxyacetamido-4H-1,2,4-triazole.
4. 3-α,α,β-trichloropropionamido-4H-1,2,4-triazole.

References Cited in the file of this patent

UNITED STATES PATENTS

| 2,535,876 | Stewart | Dec. 26, 1950 |
| 2,540,171 | Kiff | Feb. 6, 1951 |
| 2,763,661 | Grundmann et al. | Sept. 18, 1956 |

FOREIGN PATENTS

| 468,044 | Canada | Sept. 12, 1950 |

OTHER REFERENCES

Atkinson: J. Chem. Soc., Vol. 1954, pp. 4508–4510.
Frear et al.: J. of Economic Entomology, vol. 40, pp. 736–741 (1947).